(12) United States Patent
Moon et al.

(10) Patent No.: US 12,620,835 B2
(45) Date of Patent: May 5, 2026

(54) METHOD OF WIRELESSLY TRANSMITTING POWER AND DEVICE FOR PERFORMING THE METHOD

(71) Applicant: Electronics and Telecommunications Research Institute, Daejeon (KR)

(72) Inventors: Jung Ick Moon, Daejeon (KR); Gwangzeen Ko, Daejeon (KR); Sang-Won Kim, Daejeon (KR); Seong-Min Kim, Daejeon (KR); In Kui Cho, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 624 days.

(21) Appl. No.: 18/103,940

(22) Filed: Jan. 31, 2023

(65) Prior Publication Data

US 2023/0352977 A1    Nov. 2, 2023

(30) Foreign Application Priority Data

Apr. 29, 2022    (KR) ......................... 10-2022-0053432

(51) Int. Cl.
*H02J 50/12*        (2016.01)
*H02J 50/40*        (2016.01)

(52) U.S. Cl.
CPC .............. *H02J 50/12* (2016.02); *H02J 50/40* (2016.02)

(58) Field of Classification Search
CPC .......... H02J 50/12; H02J 50/40; H02J 50/402; H02J 50/80; H02J 50/90; H02J 7/00712; B60L 53/12; Y02T 10/70; Y02T 10/72
See application file for complete search history.

(56) References Cited

U.S. PATENT DOCUMENTS 8,929,957 B2 *    1/2015    Toncich .................. H02J 50/80
                                                            455/67.11
10,103,581 B2 *   10/2018   Kanno ..................... H02J 50/12
                                (Continued)

FOREIGN PATENT DOCUMENTS

JP            2012-125112        6/2012
JP            2016-500240        1/2016
                    (Continued)

*Primary Examiner* — Daniel Cavallari
*Assistant Examiner* — Brian K Baxter
(74) *Attorney, Agent, or Firm* — KILE PARK REED & HOUTTEMAN PLLC

(57)                ABSTRACT

Provided is a method of wirelessly transmitting power and a device for performing the method. The wireless power transmission device includes a transmission coil configured to wirelessly transmit power to at least one of a plurality of receivers according to a transmission frequency and a processor configured to control at least one of the transmission frequency or resonant frequencies of the plurality of receivers, and the processor is configured to set the resonant frequencies of the plurality of receivers differently based on the transmission frequency at which the wireless power transmission device wirelessly transmits power, determine a transmission amount of power to be wirelessly transmitted to each of the plurality of receivers, and change at least one of the transmission frequency or the resonant frequencies of the plurality of receivers based on the transmission amount.

10 Claims, 10 Drawing Sheets

(56)  References Cited

U.S. PATENT DOCUMENTS

| | | | | |
|---|---|---|---|---|
| 10,804,708 | B2 * | 10/2020 | Hirasaka | .................. H04K 1/10 |
| 10,826,328 | B2 | 11/2020 | Lee et al. | |
| 2012/0280575 | A1 * | 11/2012 | Kim | ................... H02J 7/00047 |
| | | | | 307/104 |
| 2015/0200716 | A1 * | 7/2015 | Miyabayashi | ...... H02J 7/00034 |
| | | | | 307/104 |
| 2016/0049796 | A1 * | 2/2016 | Cho | ........................ H02J 50/12 |
| | | | | 307/104 |
| 2016/0099578 | A1 * | 4/2016 | Hwang | ................... H02J 50/70 |
| | | | | 307/104 |
| 2016/0221459 | A1 * | 8/2016 | Jung | ....................... H02J 50/40 |
| 2018/0091005 | A1 * | 3/2018 | Lee | ....................... H02J 50/402 |
| 2018/0152050 | A1 * | 5/2018 | Ko | .......................... H02J 9/005 |
| 2019/0200136 | A1 * | 6/2019 | Mochizuki | ............ H04R 9/025 |
| 2019/0273400 | A1 | 9/2019 | Ahn et al. | |
| 2021/0067200 | A1 * | 3/2021 | Taniguchi | .............. H02J 50/10 |

FOREIGN PATENT DOCUMENTS

| | | |
|---|---|---|
| JP | 6242311 | 12/2017 |
| KR | 10-2012-0124732 | 11/2012 |
| KR | 10-1875974 | 7/2018 |
| KR | 10-2019-0021279 | 3/2019 |
| KR | 10-2032619 | 10/2019 |

* cited by examiner

METHOD OF WIRELESSLY TRANSMITTING POWER AND DEVICE FOR PERFORMING THE METHOD

CROSS-REFERENCE TO RELATED APPLICATIONS

This application claims the benefit of Korean Patent Application No. 10-2022-0053432 filed on Apr. 29, 2022, in the Korean Intellectual Property Office, the entire disclosure of which is incorporated herein by reference for all purposes.

BACKGROUND

1. Field of the Invention

One or more embodiments relate to a method of transmitting wireless power and a device for performing the method.

2. Description of the Related Art

In wireless charging technology, the ability to transmit power energy between a transmitter and a receiver is called transmission efficiency or system efficiency. In order to improve the power transmission performance of a wireless power transceiver, a resonant frequency and a power transmission frequency determined by a coil and an internal circuit of a transmitter and a receiver must be the same.

In order to match a resonant frequency with a power transmission frequency, the reactance (a combination of inductance and capacitance) of a coil and a circuit must be set to zero to resonate.

Meanwhile, as the technical field of applying wireless charging spreads from charging smartphones and electric vehicles to small mobile robots, it is necessary to charge multiple receivers simultaneously with one transmitter to reduce the space and cost required to install a transmitter.

When charging multiple receivers simultaneously with one transmitter, the transmitter may receive the same power under exactly the same conditions as the load state (e.g., the remaining battery) of the receiver and coil characteristics, but when the conditions of the receiver are different, it is necessary to distribute power appropriately and supply it to the receiver.

SUMMARY

Embodiments provide a method of wirelessly and efficiently transmitting power to a plurality of receivers disposed on each side of a transmitter in a wireless charging system simultaneously, and a device for performing the method.

Embodiments provide a device that may prevent the performance of a wireless charging system from deteriorating by causing receivers disposed on each side of a transmitter to interfere with each other and perform a method of wirelessly transmitting power to control power to be wirelessly transmitted.

According to an aspect, there is provided a device for wirelessly transmitting power according to various embodiments including a transmission coil configured to wirelessly transmit power to at least one of a plurality of receivers according to a transmission frequency and a processor configured to control at least one of the transmission frequency or resonant frequencies of the plurality of receivers, and the processor is configured to set the resonant frequencies of the plurality of receivers differently based on the transmission frequency at which the wireless power transmission device wirelessly transmits power, determine a transmission amount of power to be wirelessly transmitted to each of the plurality of receivers, and change at least one of the transmission frequency or the resonant frequencies of the plurality of receivers based on the transmission amount.

Each of the plurality of receivers may be disposed on one side and another side of the transmission coil.

The processor may be configured to set at least one of the resonant frequencies of the plurality of receivers to a frequency lower than the transmission frequency and set at least one of the resonant frequencies of the plurality of receivers to a frequency higher than the transmission frequency.

The processor may be configured to change the transmission frequency so that the transmission frequency is close to one of the resonant frequencies of the plurality of receivers.

The processor may be configured to change at least one of the resonant frequencies of the plurality of receivers so that at least one of the resonant frequencies of the plurality of receivers is close to the transmission frequency.

The processor may be configured to determine a target receiver to change a resonant frequency among the plurality of receivers based on the transmission amount and change at least one of the resonant frequency of the target receiver or the transmission frequency so that the resonant frequency of the target receiver and the transmission frequency are close to each other based on the transmission amount for the target receiver.

The processor may be configured to determine the transmission amount based on a battery state and demanded power information received from each of the plurality of receivers.

According to an aspect, there is provided a device for wirelessly transmitting power according to various embodiments including a transmission coil configured to wirelessly transmit power to at least one of a plurality of receivers according to a transmission frequency and a processor configured to control at least one of the transmission frequency or resonant frequencies of the plurality of receivers, and the processor is configured to identify the transmission frequency to wirelessly transmit power and the resonant frequencies of the plurality of receivers, the resonant frequencies being different from each other, receive demanded power information from the plurality of receivers, determine a transmission amount of power to be wirelessly transmitted to each of the plurality of receivers, based on the demanded power information, determine a parameter related to the transmission frequency and the resonant frequencies of the plurality of receivers, based on the transmission amount, and wirelessly transmit power to the plurality of receivers based on the parameter.

The processor may be configured to determine the parameter so that the transmission frequency is close to one of the resonant frequencies of the plurality of receivers.

The processor may be configured to determine the parameter so that at least one of the resonant frequencies of the plurality of receivers is close to the transmission frequency.

The processor may be configured to determine a target receiver to change a resonant frequency among the plurality of receivers based on the transmission amount and determine the parameter so that the resonant frequency of the target receiver and the transmission frequency are close to each other based on the transmission amount for the target receiver.

According to an aspect, there is provided a method of wirelessly transmitting power according to various embodiments including setting resonant frequencies of a plurality of receivers differently based on a transmission frequency at which a wireless power transmission device wirelessly transmits power, determining a transmission amount of power to be wirelessly transmitted to each of the plurality of receivers, changing at least one of the transmission frequency or the resonant frequencies of the plurality of receivers based on the transmission amount, and the wireless power transmission device includes a transmission coil configured to wirelessly transmit power to at least one of the plurality of receivers according to the transmission frequency and a processor configured to control at least one of the transmission frequency or the resonant frequencies of the plurality of receivers.

The plurality of receivers may be disposed in different directions based on the transmission coil.

The setting of the resonant frequencies of the plurality of receivers differently may include setting at least one of the resonant frequencies of the plurality of receivers to a frequency lower than the transmission frequency and setting at least one of the resonant frequencies of the plurality of receivers to a frequency higher than the transmission frequency.

The changing of at least one of the transmission frequency or the resonant frequencies of the plurality of receivers may include changing the transmission frequency so that the transmission frequency is close to one of the resonant frequencies of the plurality of receivers.

The changing of at least one of the transmission frequency or the resonant frequencies of the plurality of receivers may include changing at least one of the resonant frequencies of the plurality of receivers so that at least one of the resonant frequencies of the plurality of receivers is close to the transmission frequency.

The method may further include determining a target receiver to change a resonant frequency among the plurality of receivers based on the transmission amount, and the changing of at least one of the transmission frequency or the resonant frequencies of the plurality of receivers may include changing at least one of the resonant frequency of the target receiver or the transmission frequency so that the resonant frequency of the target receiver and the transmission frequency are close to each other based on the transmission amount for the target receiver.

The determining of the transmission amount may include determining the transmission amount based on a battery state and demanded power information received from each of the plurality of receivers.

Additional aspects of embodiments will be set forth in part in the description which follows and, in part, will be apparent from the description, or may be learned by practice of the disclosure.

According to embodiments, when power is wirelessly simultaneously transmitted to a plurality of receivers disposed in each direction of one wireless power transmission device, the power wirelessly transmitted to each of the receivers may be efficiently transmitted.

According to embodiments, by controlling a transmission amount transmitted to each of the receivers by controlling a transmission frequency at which the wireless power transmission device transmits power wirelessly or by adjusting resonant frequencies of the receivers, the magnitude of power wirelessly transmitted to each of the receivers may be controlled.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Figure 1:
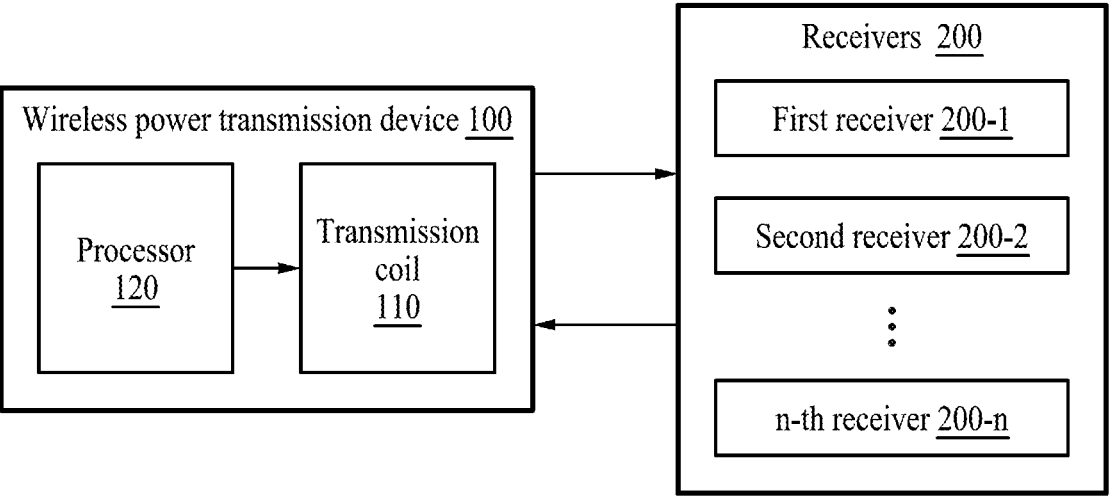
FIG. 1 is a diagram illustrating an operation in which a wireless power transmission device wirelessly transmits power to a plurality of receivers according to an embodiment.

Hereinafter, embodiments will be described in detail with reference to the accompanying drawings. However, various alterations and modifications may be made to the embodiments. Here, the embodiments are not meant to be limited by the descriptions of the present disclosure. The embodiments should be understood to include all changes, equivalents, and replacements within the idea and the technical scope of the disclosure.

The terminology used herein is for the purpose of describing particular embodiments only and is not to be limiting of the embodiments. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the examples with reference to the accompanying drawings, like reference numerals refer to like constituent elements and a repeated description related thereto will be omitted. In the description of the embodiments, a detailed description of well-known related structures or functions will be omitted when it is deemed that such description will cause ambiguous interpretation of the present disclosure.

FIG. 1 is a diagram illustrating an operation in which a wireless power transmission device 100 wirelessly transmits power to a plurality of receivers 200 according to various embodiments.

Referring to FIG. 1, the wireless power transmission device 100 according to various embodiments may include at least one of a processor 120 and a transmission coil 110. For example, the processor 120 may control at least one of a transmission frequency or resonant frequencies of the plurality of receivers 200. For example, a transmission coil 110 may wirelessly transmits power to at least one of the plurality of receivers 200 according to the transmission frequency.

For example, the wireless power transmission device 100 may include a transmission circuit (not shown) for wirelessly transmitting power to the plurality of receivers 200 according to the transmission frequency. For example, the transmission circuit may include the transmission coil 110 and a capacitor (not shown). For example, the transmission frequency may be determined according to the reactance of the transmission circuit.

For example, the processor 120 may control the reactance of the transmission circuit, for example, an inductance or a capacitance. For example, the processor 120 may control the transmission frequency by controlling the inductance or capacitance of the transmission circuit.

For example, the processor 120 may control the transmission frequency by controlling the characteristics of the capacitor of the transmission circuit connected to the transmission coil 110. As another example, the processor 120 may control the transmission frequency by controlling the clock input to the transmission circuit.

For example, the plurality of receivers 200 may wirelessly receive power from the wireless power transmission device 100. For example, each of the plurality of receivers 200 may include a reception coil (not shown) and a processor (not shown).

For example, each of the plurality of receivers 200 may include a reception circuit. For example, the reception circuit may include a reception coil. A processor of each of the plurality of receivers 200 may control the reactance of the reception circuit. For example, the processor of each of the plurality of receivers 200 may control the resonant frequency of the reception circuit by controlling the reactance of the reception circuit.

For example, the wireless power transmission device 100 may control at least one of the transmission frequency or the resonant frequencies of the plurality of receivers 200. For example, the processor 120 of the wireless power transmission device 100 may control the transmission frequency by controlling the reactance of the transmission circuit. For example, the processor of the wireless power transmission device 100 may control the resonant frequencies of each of the plurality of receivers 200 by controlling the reactance of the reception circuit of each of the plurality of receivers 200.

For example, the transmission circuit and/or the reception circuit may include a variable capacitor, a varactor diode, and the like. The wireless power transmission device 100 may control the reactance of the transmission circuit and/or the reception circuit by controlling the variable capacitor, the varactor diode, and the like.

For example, the processor of the wireless power transmission device 100 may be electrically connected to the reception circuit of each of the plurality of receivers 200. For example, the processor of the wireless power transmission device 100 may control the resonant frequencies of each of the plurality of receivers 200 by controlling the reactance of the reception circuit.

As another example, each of the wireless power transmission device 100 and the plurality of receivers 200 may be communicatively connected. The processor 120 of the wireless power transmission device 100 may transmit a control signal for controlling the reactance of the reception circuit of the plurality of receivers 200 to the plurality of receivers 200 that are communicatively connected. The processor of each of the plurality of receivers 200 may control the reactance of the reception circuit and control the resonant frequency based on the received control signal. For example, each of the wireless power transmission device 100 and the plurality of receivers 200 may be communicatively connected to each other by wire or wirelessly.

For example, the processor 120 of the wireless power transmission device 100 may determine the resonant frequencies of the plurality of receivers 200 based on the transmission frequency. For example, the processor 120 may set the resonant frequencies of the plurality of receivers 200 differently. For example, in FIG. 1, resonant frequencies of a first receiver 200-1, a second receiver 200-2, and an n-th receiver 200-$n$ are set differently from each other. For example, the resonant frequencies of each of the receivers 200-1 to 200-$n$ may be set to be different from the transmission frequency.

As an example, the processor 120 of the wireless power transmission device 100 may determine a transmission amount of power to be wirelessly transmitted to each of the plurality of receivers 200. For example, the transmission amount of power to be wirelessly transmitted to each of the receivers may be determined from the total amount of power that may be wirelessly transmitted from the transmission coil 110 of the wireless power transmission device 100.

For example, the processor 120 of the wireless power transmission device 100 may receive the battery state and/or demanded power information from each of the plurality of receivers 200. For example, the processor 120 of the wireless power transmission device 100 may determine the transmission amount of power to be wirelessly transmitted to each of the plurality of receivers 200 based on the battery state and/or demanded power information.

For example, when the battery charge amount of the first receiver 200-1 is the lowest and the demanded power magnitude of the first receiver 200-1 is the largest, the processor may determine the transmission amount of power to be wirelessly transmitted to the first receiver 200-1 more than other receivers 200-2 to 200-$n$. The above embodiment is one of various embodiments and the processor may determine the transmission amount for each of the receivers 200-1 to 200-$n$ differently from the above embodiment based on the battery state and/or the demanded power information received from the plurality of receivers 200.

For example, the processor 120 of the wireless power transmission device 100 may change at least one of the transmission frequency and/or the resonant frequencies of the plurality of receivers 200 based on the transmission amount. For example, when the transmission amount for the first receiver 200-1 among the plurality of receivers 200 is greater than the transmission amount for other receivers 200-2 to 200-$n$, the processor 120 of the wireless power transmission device 100 may change the transmission frequency close to the resonant frequency of the first receiver 200-1 or may change the resonant frequency of the first receiver 200-1 close to the transmission frequency.

For example, the processor 120 of the wireless power transmission device 100 may identify the magnitude of power wirelessly received by each of the plurality of receivers 200. For example, the processor 120 may change at least one of the transmission frequency and/or the resonant frequencies of the plurality of receivers 200 by comparing a determined transmission amount with the magnitude of power wirelessly received by each of the plurality of receivers 200. For example, the processor 120 of the wireless power transmission device 100 may determine a target receiver to change a resonant frequency among the plurality of receivers 200 based on the transmission amount. For example, when the transmission amount to be transmitted to the first receiver 200-1 among the plurality of receivers 200 is higher than the transmission amount of power wirelessly transmitted to other receivers, the processor may determine the first receiver 200-1 as the target receiver.

For example, the processor 120 of the wireless power transmission device 100 may change at least one of the resonant frequency of the target receiver or the transmission frequency so that the resonant frequency of the target receiver and the transmission frequency are close to each other based on the transmission amount.

For example, the processor 120 of the wireless power transmission device 100 may change at least one of the resonant frequency of the target receiver or the transmission frequency based on the transmission amount and identify the magnitude of power wirelessly received by the target receiver. The processor 120 may change at least one of the resonant frequency of the target receiver or the transmission frequency again by comparing a determined transmission amount with the magnitude of power wirelessly received by the target receiver.

For example, the processor 120 of the wireless power transmission device 100 may change the resonant frequency of the target receiver based on the transmission amount, and then change the transmission frequency according to the transmission amount and the magnitude of power wirelessly received by the target receiver.

For example, the processor 120 of the wireless power transmission device 100 may change the resonant frequency based on the transmission amount, and then change the resonant frequency of the target receiver according to the transmission amount and the magnitude of power wirelessly received by the target receiver.

Figure 2:
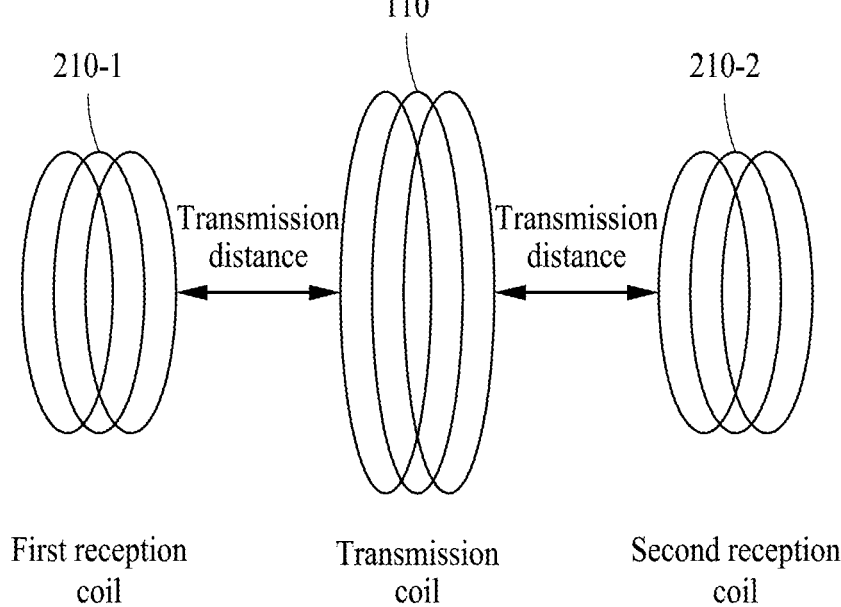
FIG. 2 is a diagram illustrating an arrangement of a transmission coil of a wireless power transmission device and reception coils of a plurality of receivers according to an embodiment.

FIG. 2 is a diagram illustrating an arrangement of the transmission coil 110 of the wireless power transmission device 100 and reception coils 210-1 and 210-2 of the plurality of receivers 200 according to various embodiments.

FIG. 2 is a diagram illustrating an example in which the first reception coil 210-1 of a first receiver 200-1 and the second reception coil 210-2 of a second receiver 200-2 are disposed on one side and the other side of the transmission coil 110 according to various embodiments.

Referring to FIG. 2, the plurality of receivers 200 according to various embodiments may be disposed at one side and the other side of the transmission coil 110. For example, based on the transmission coil 110, the first receiver 200-1 may be disposed on one side, the second receiver 200-2 may be disposed on the other side, and the first receiver 200-1 and the second receiver 200-2 may be disposed in different directions. In FIG. 2, the transmission distance from the transmission coil 110 to the first reception coil 210-1 and the second reception coil 210-2 may be the same.

In FIG. 2, when the first receiver 200-1 and the second receiver 200-2 have exactly the same shape, electrical characteristic, and transmission distance (e.g., the distance between the transmission coil 110 and the first reception coil 210-1, and the second reception coil 210-2), the first receiver 200-1 and the second receiver 200-2 may each receive power by half from the wireless power transmission device 100. However, due to the load state by the remaining battery of the first receiver 200-1 and the second receiver 200-2, the change of the resonant frequency by impedance mismatch, and the difference in coupling coefficients by different transmission distances, the magnitude of power wirelessly received by the first receiver 200-1 and the second receiver 200-2 from the wireless power transmission device 100 may vary and the system efficiency may also decrease.

In FIG. 2, the wireless power transmission device 100 according to an embodiment may set resonant frequencies differently from the transmission frequency by setting the resonant frequencies of the first receiver 200-1 and the second receiver 200-2 differently in order to control power wirelessly supplied to the first receiver 200-1 and the second receiver 200-2.

For example, the wireless power transmission device 100 may determine the transmission amount of power wirelessly transmitted to the first receiver 200-1 and the second receiver 200-2 according on the power transmission situation, for example, the load state by the remaining battery and the magnitude of the demanded power of each of the receivers.

As another example, the wireless power transmission device 100 may determine the priority of wirelessly transmitting power according to information (e.g., the magnitude of power wirelessly received by each of the plurality of receivers 200) related to the transmission of power wirelessly received from the plurality of receivers 200 and the priority (e.g., whether it is quickly charged or not) set in the plurality of receivers 200. The wireless power transmission device 100 may determine the transmission amount of power wirelessly transmitted to the plurality of receivers 200 based on the priority.

For example, the wireless power transmission device 100 may control power wirelessly supplied to each of the receivers 200 by changing at least one of the transmission frequency and/or the resonant frequencies of the first receiver 200-1 or the second receiver 200-2 according to the determined transmission amount.

As shown in FIG. 2, the wireless power transmission device 100 may efficiently wirelessly transmit power for the plurality of receivers 200 disposed in different directions based on the transmission coil 110. The plurality of receivers 200 disposed in different directions may simultaneously wirelessly receive power from the wireless power transmission device 100.

Although FIG. 2 shows an embodiment in which the first receiver 200-1 and the second receiver 200-2 are disposed based on the transmission coil 110, unlike FIG. 2, three or more receivers 200 may be disposed based on the transmission coil 110. For example, a third receiver 200-3 to an n-th receiver 200-n may be disposed on the left side of the first receiver 200-1 or on the right side of the second receiver 200-2, between the first receiver 200-1 and the transmission coil 110, and between the second receiver 200-2 and the transmission coil 110.

The wireless power transmission device 100 may control the magnitude of power wirelessly transmitted to the first receiver 200-1 and the second receiver 200-2 disposed on both sides of the transmission coil 110 and may efficiently control power wirelessly transmitted to each of the receivers 200.

Figure 3:
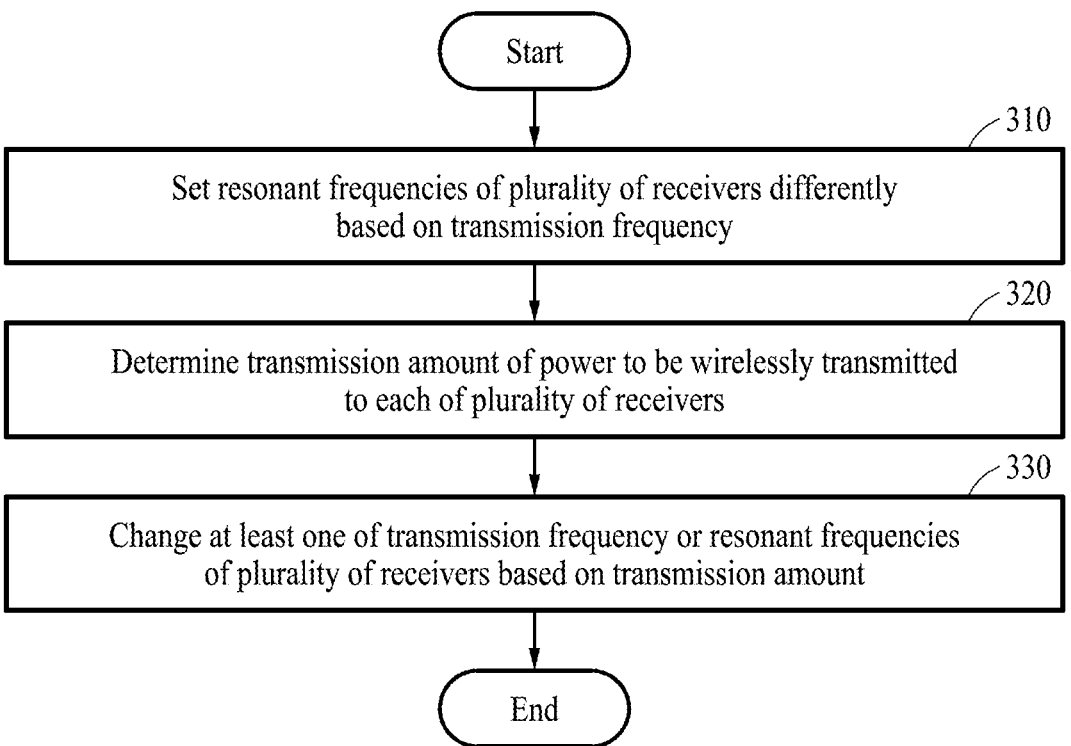
FIG. 3 is a diagram illustrating an example of a wireless power transmission method according to an embodiment.

FIG. 3 is a diagram illustrating an operation of a wireless power transmission method according to an embodiment.

Referring to FIG. 3, the wireless power transmission device 100 according to various embodiments may set the resonant frequencies of the plurality of receivers 200 differently based on a transmission frequency in operation 310. For example, the wireless power transmission device 100 may set at least one of the resonant frequencies of the plurality of receivers 200 to a frequency lower than the transmission frequency and at least one of the resonant frequencies of the plurality of receivers 200 to a frequency higher than the transmission frequency.

For example, the wireless power transmission device 100 may determine the transmission amount of power wirelessly transmitted to each of the plurality of receivers 200 in operation 320. For example, the wireless power transmission device 100 may determine the transmission amount of power wirelessly transmitted to the plurality of receivers 200 based on the battery state and demanded power information received from the plurality of receivers 200.

For example, the wireless power transmission device 100 may determine the transmission amount based on whether each of the plurality of receivers 200 is quickly charged and information on power transmission wirelessly received from the plurality of receivers 200.

For example, the wireless power transmission device 100 may change at least one of the transmission frequency or the resonant frequencies of the plurality of receivers 200 based on the transmission amount in operation 330. For example, according to the determined transmission amount, when the magnitude of power wirelessly transmitted to the first receiver 200-1 among the plurality of receivers 200 needs to be increased, the wireless power transmission device 100 may control the transmission frequency so that the transmission frequency becomes a frequency close to the resonant frequency of the first receiver 200-1 or becomes the same frequency as the resonant frequency of the first receiver 200-1.

According to the wireless power transmission method shown in FIG. 3, the wireless power transmission device 100 may control at least one of the transmission frequency and/or the resonant frequencies of the plurality of receivers 200 and wirelessly transmit power to the plurality of receivers 200 according to the changed transmission frequency. Each of the plurality of receivers 200 may wirelessly receive power according to the changed transmission frequency and/or the resonant frequencies of the plurality of receivers 200.

Figure 4:
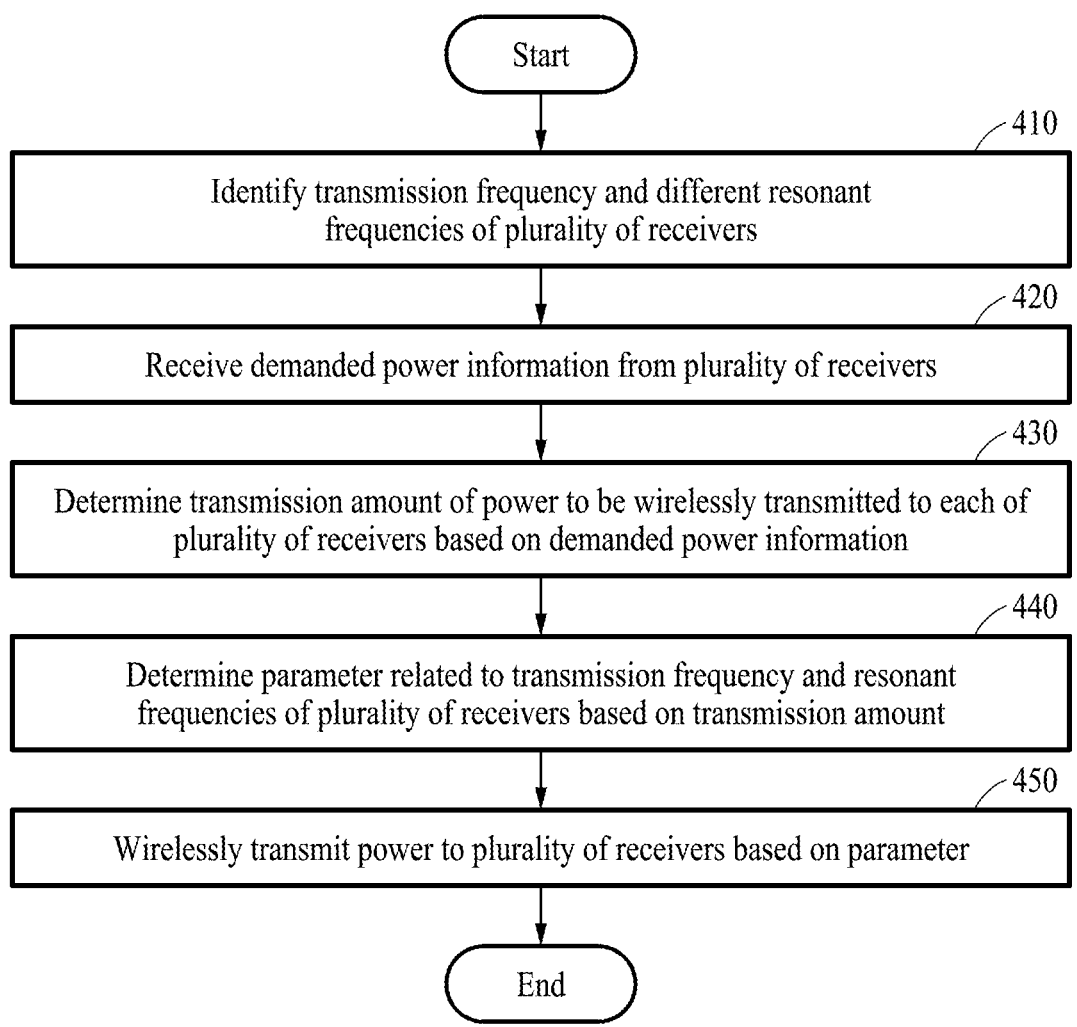
FIG. 4 is a diagram illustrating another example of a wireless power transmission method according to an embodiment.

FIG. 4 is a diagram illustrating an operation of the wireless power transmission method according to an embodiment.

Referring to FIG. 4, the wireless power transmission device 100 according to various embodiments may identify the transmission frequency and different resonant frequencies of the plurality of receivers 200 in operation 410. For example, the different resonant frequencies of the plurality of receivers 200 may mean frequencies set to frequencies different from the transmission frequency.

For example, the wireless power transmission device 100 may receive demanded power information from the plurality of receivers 200 in operation 420. For example, the demanded power information may include the magnitude of power required to be supplied to the load (e.g., the battery) connected to each of the plurality of receivers 200. For example, the demanded power information may include the priority (e.g., whether it is quickly charged or not) set to each of the plurality of receivers 200.

For example, the wireless power transmission device 100 may determine the transmission amount of power wirelessly transmitted to each of the plurality of receivers 200 based on the demanded power information in operation 430. For example, the transmission amount of power wirelessly transmitted may mean the magnitude of power wirelessly transmitted to each of the plurality of receivers 200.

For example, the wireless power transmission device 100 may determine a parameter related to the transmission frequency and the resonant frequencies of the plurality of receivers 200 based on the transmission amount in operation 440.

For example, the parameter related to the transmission frequency may mean the inductance and/or the capacitance for determining the reactance of the transmission circuit of the wireless power transmission device 100.

For example, the parameter related to the resonant frequencies of the plurality of receivers 200 may mean the inductance and/or the capacitance for determining the reactance of the reception circuit of each of the plurality of receivers 200.

For example, the wireless power transmission device 100 may control the capacitance of the transmission circuit by determining the parameter related to the transmission frequency. When the capacitance of the transmission circuit is changed, the transmission frequency may be changed.

For example, the wireless power transmission device 100 may control the capacitance of the reception circuit of the plurality of receivers 200 by determining the parameter related to the resonant frequencies of the plurality of receivers 200. When the capacitance of the reception circuit is changed, the resonant frequency of each of the plurality of receivers 200 may be changed.

For example, the determining of the parameter related to the transmission frequency and the resonant frequencies of the plurality of receivers 200 by the wireless power transmission device 100 may mean determining the transmission frequency and/or the resonant frequencies of the plurality of receivers 200. For example, the wireless power transmission device 100 may control the reactance of the transmission circuit and/or the reactance of the reception circuit of each of the plurality of receivers 200 according to the determined parameter.

For example, the wireless power transmission device 100 may wirelessly transmit power to the plurality of receivers 200 based on the parameter in operation 450. For example, the wireless power transmission device 100 may wirelessly transmit power to the transmission frequency changed according to the determined parameter. For example, the plurality of receivers 200 may wirelessly receive power from the resonant frequency changed according to the determined parameter.

Figure 5:
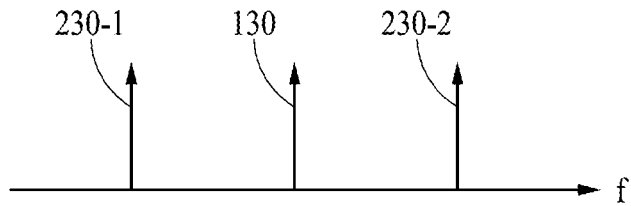
FIG. 5 is a diagram illustrating an operation in which a wireless power transmission device sets resonant frequencies of a plurality of receivers according to an embodiment.

FIG. 5 is a diagram illustrating an operation in which the wireless power transmission device 100 sets the resonant frequencies 230-1 and 230-2 of the plurality of receivers 200 according to various embodiments.

Referring to FIG. 5, the wireless power transmission device 100 according to various embodiments may set the resonant frequencies 230-1 and 230-2 of the plurality of receivers 200 differently based on the transmission frequency 130. For example, a processor of the wireless power transmission device 100 may set at least one of the resonant frequencies 230-1 and 230-2 of the plurality of receivers 200 to a frequency lower than the transmission frequency 130 and may set at least one of the resonant frequencies 230-1 and 230-2 of the plurality of receivers 200 to a frequency higher than the transmission frequency 130.

Referring to FIG. 5, the wireless power transmission device 100 according to an embodiment may set the resonant frequency 230-1 of the first receiver 200-1 to a frequency lower than the transmission frequency 130. For example, the wireless power transmission device 100 may set the resonant frequency 230-2 of the second receiver 200-2 to a higher frequency than the transmission frequency 130.

As another example from the embodiment shown in FIG. 5, the wireless power transmission device 100 may set the resonant frequency 230-2 of the second receiver 200-2 to a frequency lower than the transmission frequency 130 and may set the resonant frequency 230-1 of the first receiver 200-1 to a frequency higher than the transmission frequency 130.

For example, when the wireless power transmission device 100 may set the resonant frequencies 230-1 and 230-2 of the plurality of receivers 200 to a high frequency and a low frequency based on the transmission frequency 130 as shown in FIG. 5, the mutual coupling between the plurality of receivers 200 may be reduced, and thus the efficiency of power control of the entire charging system may be improved.

For example, when the plurality of receivers 200 includes three or more receivers, the wireless power transmission device 100 may set the resonant frequency of the third receiver 200-3 to a frequency lower than the resonant frequency 230-1 of the first receiver 200-1 and a frequency between the resonant frequency 230-1 of the first receiver 200-1 and the transmission frequency 130 in the embodiment shown in FIG. 5.

FIGS. 6 to 11 are diagrams illustrating an operation in which the wireless power transmission device 100 controls the transmission frequency 130 or resonant frequencies 230-1 and 230-2 of the plurality of receivers 200 according to various embodiments.

FIG. 6 is a diagram illustrating an operation in which the wireless power transmission device 100 controls the transmission frequency 130 according to various embodiments.

Referring to FIG. 6, the processor 120 of the wireless power transmission device 100 according to an embodiment may change the transmission frequency 130 so that the transmission frequency 130 is close to one of the plurality of resonant frequencies 230-1 and 230-2.

Figure 6A:
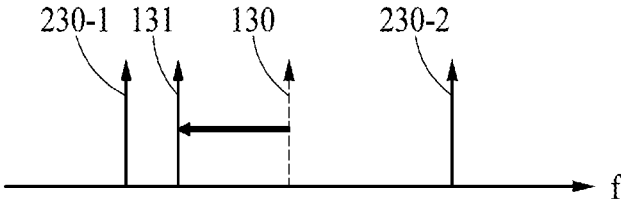
FIGS. 6A, 6B, 7A, 7B, 8A, 8B, 9A, 9B, 10, and 11 are diagrams illustrating an operation in which a wireless power transmission device controls a transmission frequency or resonant frequencies of a plurality of receivers according to an embodiment.
Figure 6B:
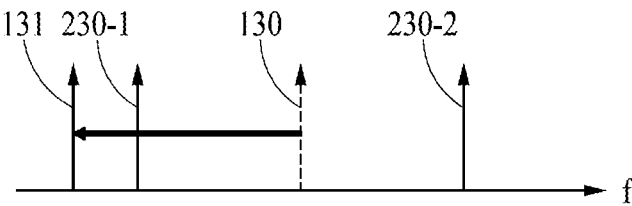

For example, as shown in FIGS. 6A and 6B, the wireless power transmission device 100 may wirelessly transmit power according to a changed transmission frequency 131 by controlling the transmission frequency 130. In FIG. 6A, the wireless power transmission device 100 may change the transmission frequency 130 so that the transmission frequency 130 is close to the resonant frequency 230-1 of the first receiver 200-1.

For example, in FIGS. 6A and 6B, the wireless power transmission device 100 may change the transmission frequency 130 based on the determined transmission amount. In the case of FIGS. 6A and 6B, the transmission amount of power wirelessly transmitted to the first receiver 200-1 may be greater than the transmission amount of power wirelessly transmitted to the second receiver 200-2. As another example, in FIGS. 6A and 6B, according to the remaining battery of the first receiver 200-1 and the second receiver 200-2, the magnitude of power wirelessly transmitted to the first receiver 200-1 and the second receiver 200-2 may be the same.

For example, in the case of wirelessly transmitting power according to the changed transmission frequency 131 in FIG. 6B, the magnitude of power wirelessly transmitted to the second receiver 200-2 may be smaller than in the case of FIG. 6A. The wireless power transmission device 100 may change the transmission frequency 130 as shown in FIG. 6A or 6B based on the determined transmission amount and may control the magnitude of power wirelessly transmitted to the first receiver 200-1 and the second receiver 200-2 by wirelessly transmitting power according to the changed transmission frequency 131.

FIG. 7 is a diagram illustrating an operation in which the wireless power transmission device 100 controls the transmission frequency 130 according to various embodiments.

Referring to FIG. 7, the processor 120 of the wireless power transmission device 100 according to an embodiment may change the transmission frequency 130 so that the transmission frequency 130 is close to one of the plurality of resonant frequencies 230-1 and 230-2.

Figure 7A:
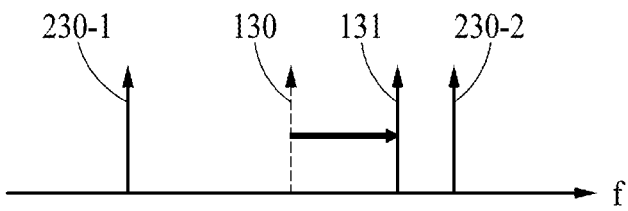
Figure 7B:
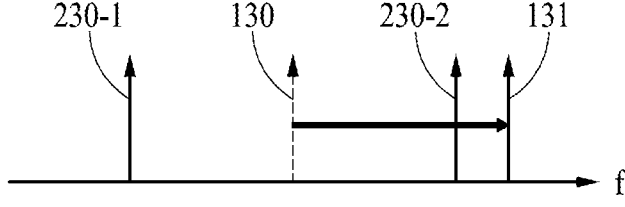

FIG. 7 is a diagram illustrating an embodiment in which the wireless power transmission device 100 changes the transmission frequency 130 so that the transmission frequency 130 is close to the resonant frequency 230-2 of the second receiver 200-2. The wireless power transmission device 100 may control the transmission frequency 130 as shown in FIGS. 7A and 7B, in substantially the same operation as the wireless power transmission device 100 controls the transmission frequency 130.

For example, in FIGS. 7A and 7B, the wireless power transmission device 100 may change the transmission frequency 130 based on the determined transmission amount. In the case of FIGS. 7A and 7B, the transmission amount of power wirelessly transmitted to the second receiver 200-2 may be greater than the transmission amount of power wirelessly transmitted to the first receiver 200-1. As another example, in FIGS. 7A and 7B, according to the remaining battery state of the first receiver 200-1 and the second receiver 200-2, the magnitude of power wirelessly transmitted to the first receiver 200-1 and the second receiver 200-2 may be the same.

For example, when power is wirelessly transmitted according to the changed transmission frequency 131 in FIG. 7B, the magnitude of power wirelessly transmitted to the first receiver 200-1 may be smaller than that of FIG. 7A. Based on the determined transmission amount, the wireless power transmission device 100 may control the magnitude of power wirelessly transmitted to the first receiver 200-1 and the second receiver 200-2 by changing the transmission frequency 130 and wirelessly transmitting power according to the changed transmission frequency 131 as shown in FIG. 7A or B.

FIG. 8 is a diagram illustrating an operation in which the wireless power transmission device 100 controls the resonant frequency 230-1 of the first receiver 200-1 according to various embodiments.

Referring to FIG. 8, the processor 120 of the wireless power transmission device 100 according to an embodiment may change one of the resonant frequencies 230-1 and 230-2 so that at least one of the resonant frequencies 230-1 and 230-2 is close to the transmission frequency 130.

Figure 8A:
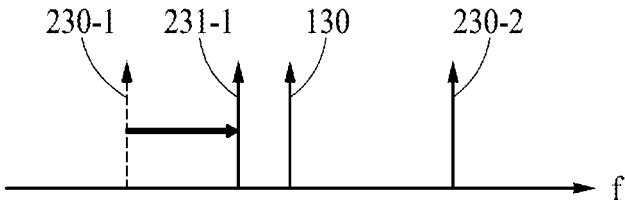
Figure 8B:
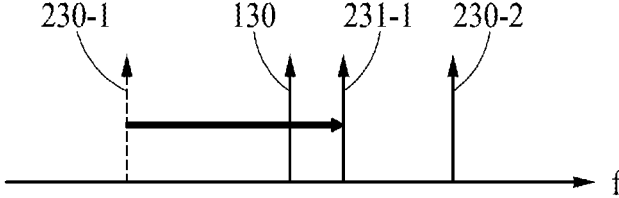

FIG. 8 is a diagram illustrating an embodiment in which the wireless power transmission device 100 changes the resonant frequency 230-1 of the first receiver 200-1 so that the resonant frequency 230-1 of the first receiver 200-1 is close to the transmission frequency 130. In FIGS. 8A and 8B, the wireless power transmission device 100 may change the resonant frequency 230-1 of the first receiver 200-1 so that a changed resonant frequency 231-1 of the first receiver 200-1 is close to the transmission frequency 130.

In FIGS. 8A and 8B, the wireless power transmission device 100 may control the resonant frequency 230-1 of the first receiver 200-1 according to the determined transmission amount. For example, in FIGS. 8A and 8B, the transmission amount of power wirelessly transmitted to the first receiver 200-1 may be greater than the transmission amount of power wirelessly transmitted to the second receiver 200-2.

As another example, even when the transmission amount of power wirelessly transmitted to the first receiver 200-1 is the same as the transmission amount of power wirelessly transmitted to the second receiver 200-2, according to the battery state of the first receiver 200-1 and the second receiver 200-2, the wireless power transmission device 100 may change the resonant frequency 230-1 of the first receiver 200-1 as shown in FIGS. 8A and 8B. For example, as shown in FIGS. 8A and 8B, when the resonant frequency 230-1 of the first receiver 200-1 is close to the transmission frequency compared to the resonant frequency 230-2 of the second receiver 200-2, the magnitude of power wirelessly transmitted to the first receiver 200-1 and the second receiver 200-2 from the wireless power transmission device 100 may be the same.

FIG. 9 is a diagram illustrating an operation in which the wireless power transmission device 100 controls the resonant frequency 230-2 of the second receiver 200-2 according to various embodiments.

Figure 9A:
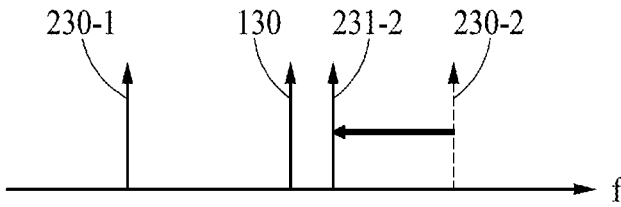
Figure 9B:
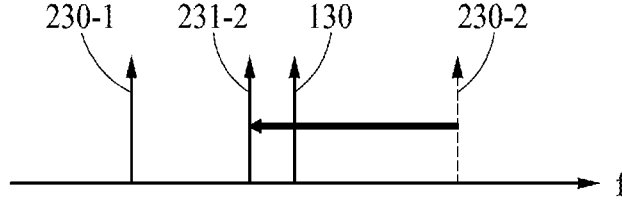

FIG. 9 is a diagram illustrating an embodiment in which the wireless power transmission device 100 changes the resonant frequency 230-2 of the second receiver 200-2 so that the resonant frequency 230-2 of the second receiver 200-2 is close to the transmission frequency 130. In FIGS. 9A and 9B, the wireless power transmission device 100 may change the resonant frequency 230-2 of the second receiver 200-2 so that a changed resonant frequency 231-2 of the second receiver 200-2 is close to the transmission frequency 130.

In FIGS. 9A and 9B, the wireless power transmission device 100 may control the resonant frequency 230-2 of the second receiver 200-2 according to the determined transmission amount. For example, in FIGS. 9A and 9B, the transmission amount of power wirelessly transmitted to the second receiver 200-2 may be greater than the transmission amount of power wirelessly transmitted to the first receiver 200-1.

As another example, even when the transmission amount of power wirelessly transmitted to the second receiver 200-2 is the same as the transmission amount of power wirelessly transmitted to the first receiver 200-1, according to the battery state of the first receiver 200-1 and the second receiver 200-2, the wireless power transmission device 100 may change the resonant frequency 230-2 of the second receiver 200-2 as shown in FIGS. 9A and 9B. For example, when the resonant frequency of the second receiver 200-2 is close to the resonant frequency 230-1 of the first receiver 200-1, as shown in of FIGS. 9A and 9B, the magnitude of power wirelessly transmitted from the wireless power transmission device 100 to the first receiver 200-1 and the second receiver 200-2 may be the same.

Figure 10:
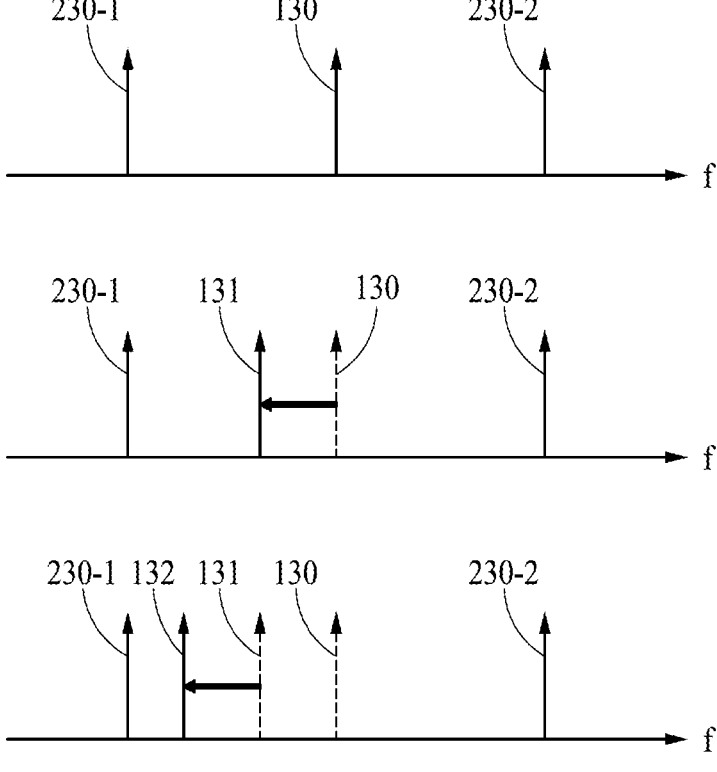

FIG. 10 is a diagram illustrating an operation in which the wireless power transmission device 100 controls the transmission frequency 130 based on the determined transmission amount and the magnitude of power wirelessly received by the plurality of receivers 200 according to various embodiments.

For example, the wireless power transmission device 100 may control the transmission frequency 130 based on the determined transmission amount. For example, the wireless power transmission device 100 may wirelessly transmit power to the first receiver 200-1 and the second receiver 200-2 according to the changed transmission frequency 131. The wireless power transmission device 100 may identify the magnitude of power wirelessly transmitted to the first receiver 200-1 and the second receiver 200-2 according to the changed transmission frequency 131.

For example, the wireless power transmission device 100 may compare the determined transmission amount with the magnitude of power wirelessly received by the first receiver 200-1 and the second receiver 200-2. For example, when the magnitude of power wirelessly received by the first receiver 200-1 is smaller than the transmission amount determined for the first receiver 200-1, the wireless power transmission device 100 may change the transmission frequency 131. For example, a changed transmission frequency 132 may be a frequency close to the resonant frequency 230-1 of the first receiver 200-1 compared to the previously changed transmission frequency 131.

FIG. 10 shows an example of an operation of the wireless power transmission device 100 that changes the transmission frequency 130 to close to the resonant frequency 230-1 of the first receiver 200-1 but is not limited thereto. For example, in the operation in which the wireless power transmission device 100 changes the resonant frequency 230-1 of the first receiver 200-1 to a frequency close to the transmission frequency 130 or changes the resonant frequency 230-2 of the second receiver 200-2 to a frequency close to the transmission frequency 130, the operation of the wireless power transmission device 100 described in FIG. 10 may be applied substantially similarly.

Figure 11:
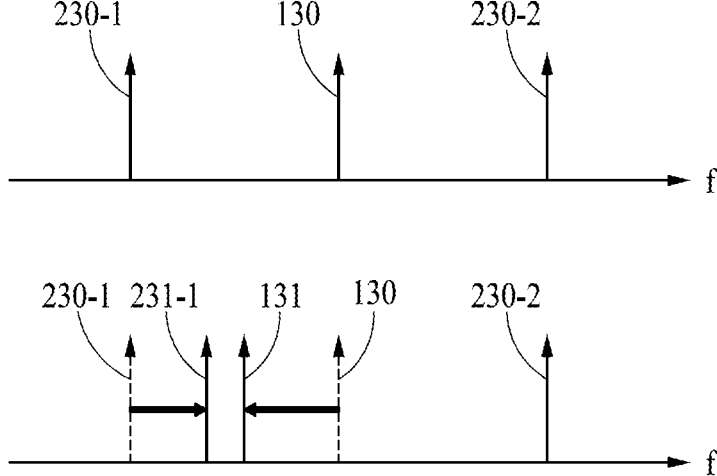

FIG. 11 is a diagram illustrating an operation in which the wireless power transmission device 100 simultaneously controls the transmission frequency 130 and any one of the resonant frequencies 230-1 and 230-2 of the plurality of receivers 200 according to various embodiments.

Referring to FIG. 11, the wireless power transmission device 100 may control the resonant frequency of the target receiver determined from among the plurality of receivers 200 and/or the transmission frequency 130. In FIG. 11, the determined target receiver may mean the first receiver 200-1.

For example, according to the determined transmission amount, when more power is wirelessly transmitted to the first receiver 200-1 and smaller power is wirelessly transmitted to the second receiver 200-2, the wireless power transmission device 100 may simultaneously change the transmission frequency 130 and the resonant frequency 230-1 of the first receiver 200-1 as shown in FIG. 11. For example, the wireless power transmission device 100 may wirelessly transmit power according to the changed transmission frequency 131. For example, the first receiver 200-1 may wirelessly receive power according to the changed resonant frequency 231-1 and the second receiver 200-2 may wirelessly receive power according to the original resonant frequency 230-2.

The operation in which the wireless power transmission device 100 of FIGS. 6 to 11 controls the transmission frequency 130 and/or the resonant frequencies 230-1 and 230-2 of the plurality of receivers 200 so as not to match the transmission frequency 130 with the resonant frequencies 230-1 and 230-2 of the plurality of receivers 200 is described but is not limited thereto. For example, in FIG. 6, the wireless power transmission device 100 may control the transmission frequency 130 so that the transmission frequency 130 matches the resonant frequency 230-1 of the first receiver 200-1.

In FIGS. 6 to 11, an example in which the wireless power transmission device 100 wirelessly transmits power to the first receiver 200-1 and the second receiver 200-2 is illustrated but is not limited thereto. For example, the wireless power transmission device 100 may wirelessly transmit power to the first receiver 200-1, the second receiver 200-2 and the third receiver 200-3 and may control at least one of the resonant frequencies of the first to third receivers 200-1, 200-2, and 200-3 or transmission frequency 130.

The components described in the embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the embodiments may be implemented by software, and the software may be recorded on a recording medium. The components, the functions, and the processes described in the embodiments may be implemented by a combination of hardware and software.

The method according to embodiments may be written in a computer-executable program and may be implemented as various recording media such as magnetic storage media, optical reading media, or digital storage media.

Various techniques described herein may be implemented in digital electronic circuitry, computer hardware, firmware, software, or combinations thereof. The implementations may be achieved as a computer program product, i.e., a computer program tangibly embodied in an information carrier, e.g., in a machine-readable storage device (for example, a computer-readable medium) or in a propagated signal, for processing by, or to control an operation of, a data processing apparatus, e.g., a programmable processor, a computer, or multiple computers. A computer program, such as the computer program(s) described above, may be written in any form of a programming language, including compiled or interpreted languages, and may be deployed in any form, including as a stand-alone program or as a module, a component, a subroutine, or other units suitable for use in a computing environment. A computer program may be deployed to be processed on one computer or multiple computers at one site or distributed across multiple sites and interconnected by a communication network.

Processors suitable for processing of a computer program include, by way of example, both general and special purpose microprocessors, and any one or more processors of any kind of digital computer. Generally, a processor will receive instructions and data from a read-only memory or a random-access memory, or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Examples of information carriers suitable for embodying computer program instructions and data include semiconductor memory devices, e.g., magnetic media such as hard disks, floppy disks, and magnetic tape, optical media such as compact disk read only memory (CD-ROM) or digital video disks (DVDs), magneto-optical media such as floptical disks, read-only memory (ROM), random-access memory (RAM), flash memory, erasable programmable ROM (EPROM), or electrically erasable programmable ROM (EEPROM). The processor and the memory may be supplemented by, or incorporated in special purpose logic circuitry.

In addition, non-transitory computer-readable media may be any available media that may be accessed by a computer and may include both computer storage media and transmission media.

Although the present specification includes details of a plurality of specific embodiments, the details should not be construed as limiting any invention or a scope that can be claimed, but rather should be construed as being descriptions of features that may be peculiar to specific embodiments of specific inventions. Specific features described in the present specification in the context of individual embodiments may be combined and implemented in a single embodiment. On the contrary, various features described in the context of a single embodiment may be implemented in a plurality of embodiments individually or in any appropriate sub-combination. Furthermore, although features may operate in a specific combination and may be initially depicted as being claimed, one or more features of a claimed combination may be excluded from the combination in some cases, and the claimed combination may be changed into a sub-combination or a modification of the sub-combination.

Likewise, although operations are depicted in a specific order in the drawings, it should not be understood that the operations must be performed in the depicted specific order or sequential order or all the shown operations must be performed in order to obtain a preferred result. In specific cases, multitasking and parallel processing may be advantageous. In addition, it should not be understood that the separation of various device components of the aforementioned embodiments is required for all the embodiments, and it should be understood that the aforementioned program components and apparatuses may be integrated into a single software product or packaged into multiple software products.

The embodiments disclosed in the present specification and the drawings are intended merely to present specific examples in order to aid in understanding of the present disclosure, but are not intended to limit the scope of the present disclosure. It will be apparent to those skilled in the art that various modifications based on the technical spirit of the present disclosure, as well as the disclosed embodiments, can be made.

What is claimed is:

1. A wireless power transmission device comprising:
   a transmission coil configured to wirelessly transmit power to at least one of a plurality of receivers according to a transmission frequency; and
   a processor configured to control at least one of the transmission frequency or resonant frequencies of the plurality of receivers,
   wherein the processor is configured to:
   set at least one of the resonant frequencies of the plurality of receivers to a frequency lower than the transmission frequency; and set at least one of the resonant frequencies of the plurality of receivers to a frequency higher than the transmission frequency based on the transmission frequency at which the wireless power transmission device wirelessly transmits power, thereby transmitting power to the plurality of receivers simultaneously;
   determine a transmission amount of power to be wirelessly transmitted to each of the plurality of receivers; and
   change at least one of the transmission frequency or the resonant frequencies of the plurality of receivers based on the transmission amount, and change the resonant frequency of a first receiver among the plurality of receivers so that the resonant frequency of the first receiver approaches the transmission frequency, when the transmission amount for the first receiver is greater than the transmission amounts for the other receivers.

2. The wireless power transmission device of claim 1, wherein each of the plurality of receivers is disposed on one side and another side of the transmission coil.

3. The wireless power transmission device of claim 1, wherein the processor is configured to change the transmission frequency so that the transmission frequency is close to one of the resonant frequencies of the plurality of receivers.

4. The wireless power transmission device of claim 1, wherein the processor is configured to determine the transmission amount based on a battery state and demanded power information received from each of the plurality of receivers.

5. A wireless power transmission device comprising:
a transmission coil configured to wirelessly transmit power to at least one of a plurality of receivers according to a transmission frequency; and
a processor configured to control at least one of the transmission frequency or resonant frequencies of the plurality of receivers,
wherein the processor is configured to:
set at least one of the resonant frequencies of the plurality of receivers to a frequency lower than the transmission frequency; and set at least one of the resonant frequencies of the plurality of receivers to a frequency higher than the transmission frequency, thereby transmitting power to a plurality of receivers simultaneously;
identify the transmission frequency to wirelessly transmit power and the resonant frequencies of the plurality of receivers, the resonant frequencies being different from each other;
receive demanded power information from the plurality of receivers;
determine a transmission amount of power to be wirelessly transmitted to each of the plurality of receivers, based on the demanded power information;
determine a parameter related to the transmission frequency and the resonant frequencies of the plurality of receivers, based on the transmission amount;
wirelessly transmit power to the plurality of receivers based on the parameter; and
change the resonant frequency of a first receiver among the plurality of receivers so that the resonant frequency of the first receiver approaches the transmission frequency, when the transmission amount for the first receiver is greater than the transmission amounts for the other receivers.

6. The wireless power transmission device of claim 5, wherein the processor is configured to determine the parameter so that the transmission frequency is close to one of the resonant frequencies of the plurality of receivers.

7. A method of wirelessly transmitting power, the method comprising:
setting resonant frequencies of a plurality of receivers differently based on a transmission frequency at which a wireless power transmission device wirelessly transmits power;
determining a transmission amount of power to be wirelessly transmitted to each of the plurality of receivers;
changing at least one of the transmission frequency or the resonant frequencies of the plurality of receivers based on the transmission amount,
wherein the setting of the resonant frequencies of the plurality of receivers differently comprises:
setting at least one of the resonant frequencies of the plurality of receivers to a frequency lower than the transmission frequency; and setting at least one of the resonant frequencies of the plurality of receivers to a frequency higher than the transmission frequency, thereby transmitting power to a plurality of receivers simultaneously; and
changing the resonant frequency of the first receiver so that the resonant frequency of the first receiver approaches the transmission frequency, when the transmission amount for a first receiver among the plurality of receivers is greater than the transmission amounts for the other receivers,
wherein the wireless power transmission device comprises:
a transmission coil configured to wirelessly transmit power to at least one of the plurality of receivers according to the transmission frequency; and
a processor configured to control at least one of the transmission frequency or the resonant frequencies of the plurality of receivers.

8. The method of claim 7, wherein the plurality of receivers is disposed in different directions based on the transmission coil.

9. The method of claim 7, wherein the changing of at least one of the transmission frequency or the resonant frequencies of the plurality of receivers comprises changing the transmission frequency so that the transmission frequency is close to one of the resonant frequencies of the plurality of receivers.

10. The method of claim 7, wherein the determining of the transmission amount comprises determining the transmission amount based on a battery state and demanded power information received from each of the plurality of receivers.

* * * * *